US007097007B2

(12) United States Patent
Lin

(10) Patent No.: US 7,097,007 B2
(45) Date of Patent: Aug. 29, 2006

(54) VENTED SLOT BRAKE ROTOR

(76) Inventor: Warren Lin, 14 Daro Ct., Mountville, NJ (US) 07045

( * ) Notice: Subject to any disclaimer, the term of this patent is extended or adjusted under 35 U.S.C. 154(b) by 0 days.

(21) Appl. No.: 10/608,246

(22) Filed: Jun. 27, 2003

(65) Prior Publication Data

US 2004/0200678 A1    Oct. 14, 2004

Related U.S. Application Data

(60) Provisional application No. 60/462,110, filed on Apr. 11, 2003.

(51) Int. Cl.
*F16D 65/12*    (2006.01)
(52) U.S. Cl. .............................. 188/218 XL
(58) Field of Classification Search ......... 188/218 XL, 188/18 A, 264 AA
See application file for complete search history.

(56) References Cited

U.S. PATENT DOCUMENTS

| | | | |
|---|---|---|---|
| 3,002,595 A | 10/1961 | Weir | 192/58 |
| 3,809,192 A | 5/1974 | Stehle | 188/218 XL |
| 5,417,313 A * | 5/1995 | Matsuzaki et al. | 188/218 XL |
| 6,161,660 A * | 12/2000 | Suga et al. | 188/218 XL |
| 6,241,054 B1 * | 6/2001 | Von Sivers et al. | 188/73.2 |
| 6,308,808 B1 | 10/2001 | Krenkel et al. | 188/218 XL |
| 6,334,515 B1 | 1/2002 | Martin | 188/218 XL |
| 6,347,691 B1 | 2/2002 | Aydt | 188/218 XL |
| 6,386,341 B1 * | 5/2002 | Martin | 188/218 XL |
| 6,422,358 B1 | 7/2002 | Deibel | 188/218 XL |
| 6,467,590 B1 | 10/2002 | Aydt | 188/218 XL |
| 2001/0040077 A1 | 11/2001 | Qian et al. | 188/218 XL |
| 2002/0027049 A1 | 3/2002 | Aydt | 188/218 XL |
| 2002/0153213 A1 | 10/2002 | Gruber et al. | 188/218 XL |
| 2003/0034213 A1 | 2/2003 | Qian et al. | 188/218 XL |

FOREIGN PATENT DOCUMENTS

EP    1048874    * 11/2000

* cited by examiner

*Primary Examiner*—James McClellan
*Assistant Examiner*—Bradley T. King
(74) *Attorney, Agent, or Firm*—Michael I Kroll

(57) ABSTRACT

A brake rotor and methods for cooling and/or removing debris from a brake rotor are provided. The brake rotor may include a first and second annular braking surfaces jointly defining inner and outer circumferential surfaces and a central portion and a hat portion disposed in the central portion and adapted for mounting the rotor to a vehicle. The rotor may also include a plurality of vanes provided between the inner and outer circumferential surfaces, which may define a plurality of corresponding flow channels between at least a pair of vanes. Each flow channel may include a first flow channel opening (e.g., inlet) provided near the central region and a second flow channel opening (e.g., outlet) provided near a periphery of the brake rotor. The rotor and methods also may include a plurality of first slots provided on the first annular braking surface and a plurality of second slots provided on the second annular braking surface corresponding to the plurality of first slots. At least one first opening may be included within one or more slots. Similarly, at least one second opening may be provided within each second slot. Each second opening of each second slot may correspond substantially to and fluid communicate with a first opening of a first slot.

6 Claims, 9 Drawing Sheets

VENTED SLOT BRAKE ROTOR

CLAIM TO PRIORITY

This application claims benefit under 35 U.S.C. § 119(e) of U.S. Provisional Patent Application No. 60/462,110, filed Apr. 11, 2003, the entire disclosure of which is herein incorporated by reference.

FIELD OF THE PRESENT INVENTION

Embodiments of the present invention are directed toward novel brake rotor designs, and more particularly to solid and vented brake rotors having a slotted, vented braking surface.

BACKGROUND OF THE INVENTION

Generally, existing brake rotors include solid, non-venting rotor designs and venting designs, as disclosed in U.S. Pat. No. 5,878,848 (vented). Accordingly, conventional ventilated brake rotors generally include a pair of mutually spaced-apart annular disks that present two opposed external braking surfaces for engaging brake pads under a clamping operation of a braking actuator (brake caliper). The space between the disks typically includes a number of vanes with flow passages defined between each pair of adjacent vanes that extend between the disks from their inner diameter to their outer diameter. Rotation of the rotor causes the vanes to induce air flow through the flow passages from the inner diameter to the outer diameter of the disks, providing increased convective heat transfer from the rotor. Inlets for the vanes reside adjacent the external braking surface of the base of the rotor.

Slots may be cut into one or more of the external braking surfaces of a brake rotor, as shown in U.S. Pat. No. 6,446,770, which allow for the collection of gases which are produced by the disc brake pad material when a braking force is applied to the external braking surfaces. Such slots may also be used as a cleaning mechanism to clean a corresponding brake pad surface to collect brake dust produced by the brake pads during braking. For additional cooling and/or venting of braking gases produced by braking, especially for today's high-performance automobiles and racing applications, a series of cross-drilled through-holes may be formed in each external braking surface, as shown in U.S. Design patent nos. D465,179 and D456,326.

The use of slots and cross-drilled holes however, decreases the heat dissipation surface area of a respective external braking surface as well as decrease the braking surface area. Either or both of these decreases in respective surface areas may result in a decrease in braking performance (e.g., increased braking distances). Moreover, the more rotor material removed (by the creations of slots and/or the use cross-drilled holes), the more prone the rotor may be to premature failure due to thermal fatigue. This may result in rotor warping.

Slotted rotors may also be prone to yet another problem. Collected brake dust may ultimately clog one or more slots after time resulting in a decrease or cessation of the ability of the slot to perform this job.

SUMMARY OF THE INVENTION

The present invention addresses the above problems of prior art brake rotors and presents novel rotors and methods for cooling, venting and/or cleaning of brake rotors. Specifically, embodiments of the present invention may not only increase brake performance and cooling efficiency of a brake rotor, but also may insure that slotted rotors remain free and clear of debris by causing the debris to be "suctioned" from the external braking surface of the rotor through an opening in the slot. Specifically, the opening may communicate with the vents of the rotor (in a vented rotor design), so that the airflow generated by the vents when the rotor is moving acts as a negative pressure force to draw material and gases from one or more slots.

Not only does the open slot features of the embodiments of the present invention allow for the collection and escape of generated braking gases between a braking pad and an external braking surface, and the debris produced therefrom, but such features may also increase the heat dissipation surface area of a respective external braking surface over prior art cross-drilled and/or slotted brake rotor designs, thereby making the rotor more resistant to thermal fatigue for more effective braking ability.

Accordingly, in a first embodiment of the present invention a brake rotor may include a first and a second annular braking surface, which jointly define inner and outer circumferential surfaces and a central portion of the rotor. The rotor may also include a first slot provided on one or both annular braking surfaces and a first opening, which may be provided in one or more slots. All or a portion of the first opening may be provided within the first slot.

In another embodiment of the present invention, a brake rotor may include a first and a second annular braking surface jointly defining inner and outer circumferential surfaces, and a central portion, a first slot provided on the first annular braking surface and a first opening. All or a portion of the first opening may be provided within the first slot. The brake rotor may also include a second opening which may be in fluid communication with the first opening and the second annular braking surface.

In another embodiment of the present invention, a slot for a braking surface for a braking device may include an elongated groove having at least one of a diameter, a depth, a width and a length and at least one first opening. All or a portion of the first opening is provided within the slot.

In yet another embodiment of the present invention, a method of communicating gases and/or material from a braking surface of a braking device may include providing at least one first slot in the braking surface. The slot may include at least one first opening where all or a portion of the first opening is provided within the slot and the first opening is in fluid communication with a vent. The method may also include communicating gases and/or material from the first braking surface as a result of friction between a braking pad and the first braking surface to the vent via the first opening. This method may be used with any of the rotors and/or slot set out in the previous embodiments.

In still yet another embodiment, a brake rotor may include a first and a second annular braking surface jointly defining inner and outer circumferential surfaces and a central portion, a hat portion disposed in the central portion and adapted for mounting the rotor to a vehicle and a plurality of vanes provided between the inner and outer circumferential surfaces. A plurality of corresponding flow channels may be defined between at least a pair of vanes of the plurality of vanes and each flow channel may include a first flow channel opening provided near the central region and a second flow channel opening provided near a periphery of the brake rotor. The rotor may also include a plurality of first slots provided on the first annular braking surface, a plurality of second slots provided on the second annular braking surface corresponding to the plurality of first slots and at least one first opening. All or a portion of the first opening may be provided within each first slot. The brake rotor may also include at least one second opening, all or a portion of which being provided within each second slot. Each second opening of each second slot may correspond substantially to and fluid communicate with a first opening of a first slot.

Other embodiments of the present invention may include any vehicle and motor vehicle (e.g., automobile, plane, train, bus, truck, and the like) having one more brake rotors according to one or more of the above embodiments.

DETAILED DESCRIPTION OF THE EMBODIMENTS

Figure 1A:
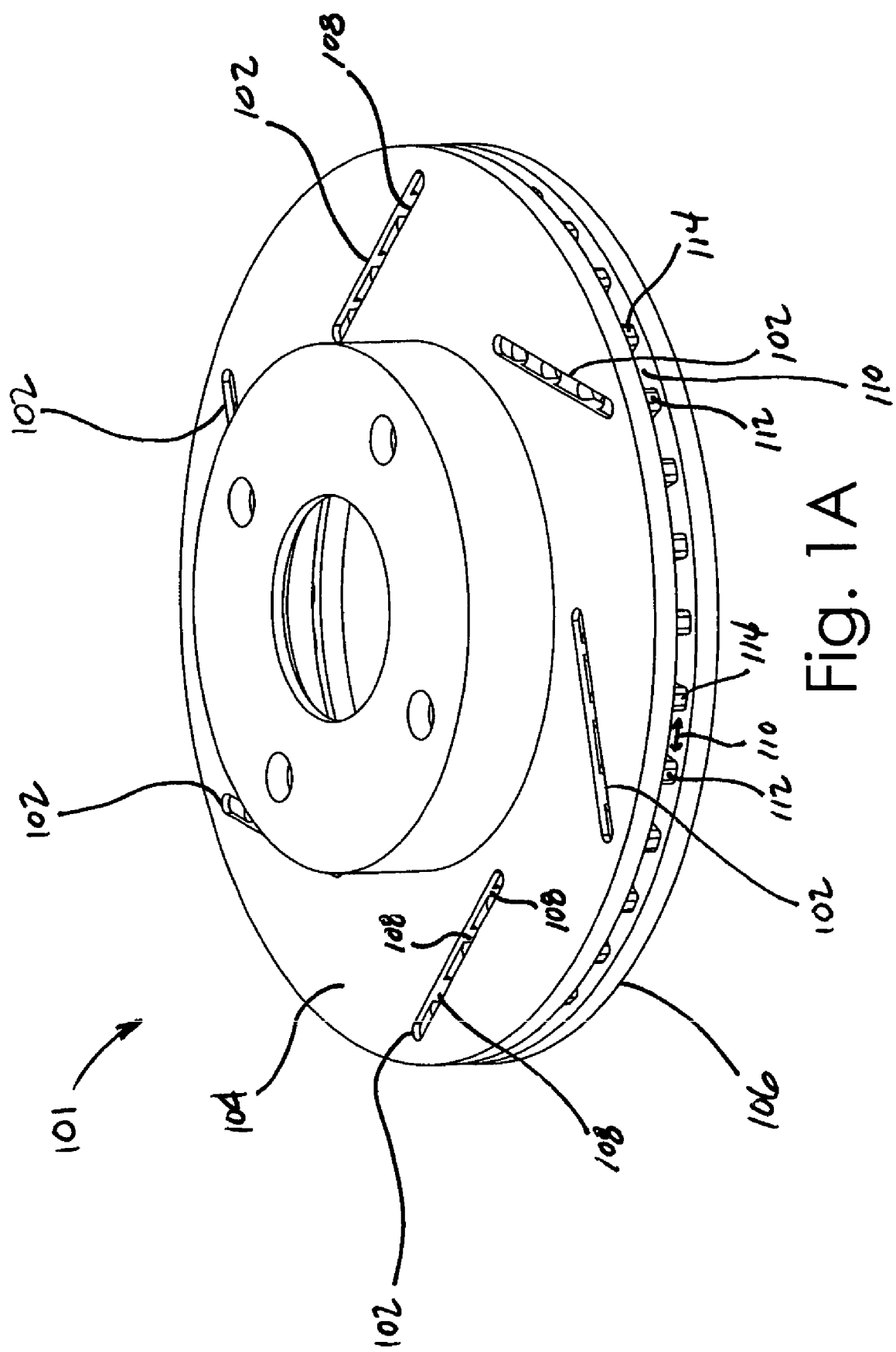
FIG. 1A is a perspective view of a brake rotor according to an embodiment of the present invention.
Figure 1B:
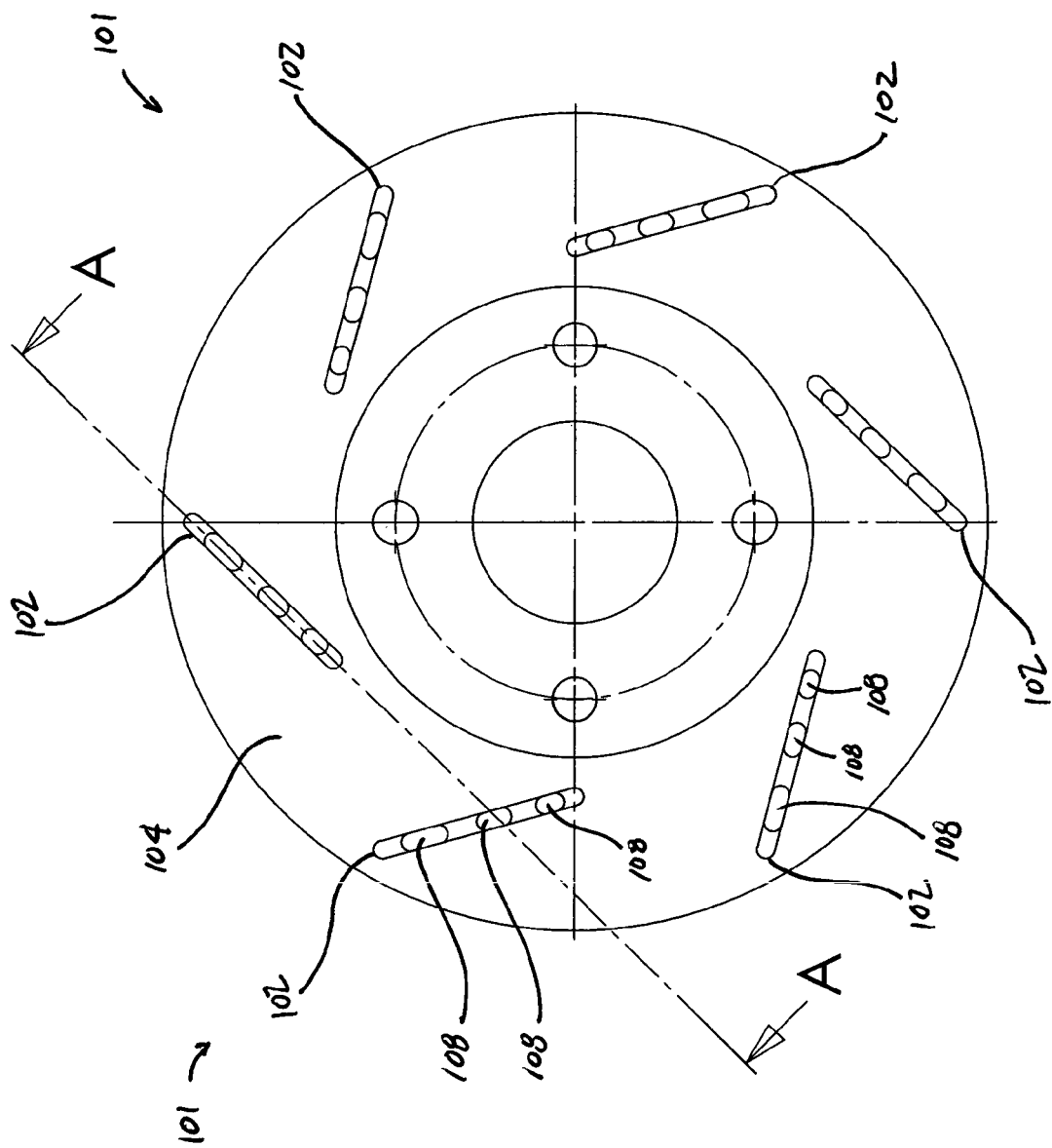
FIG. 1B is a top view of a brake rotor according to the embodiment illustrated in FIG. 1A.
Figure 2:
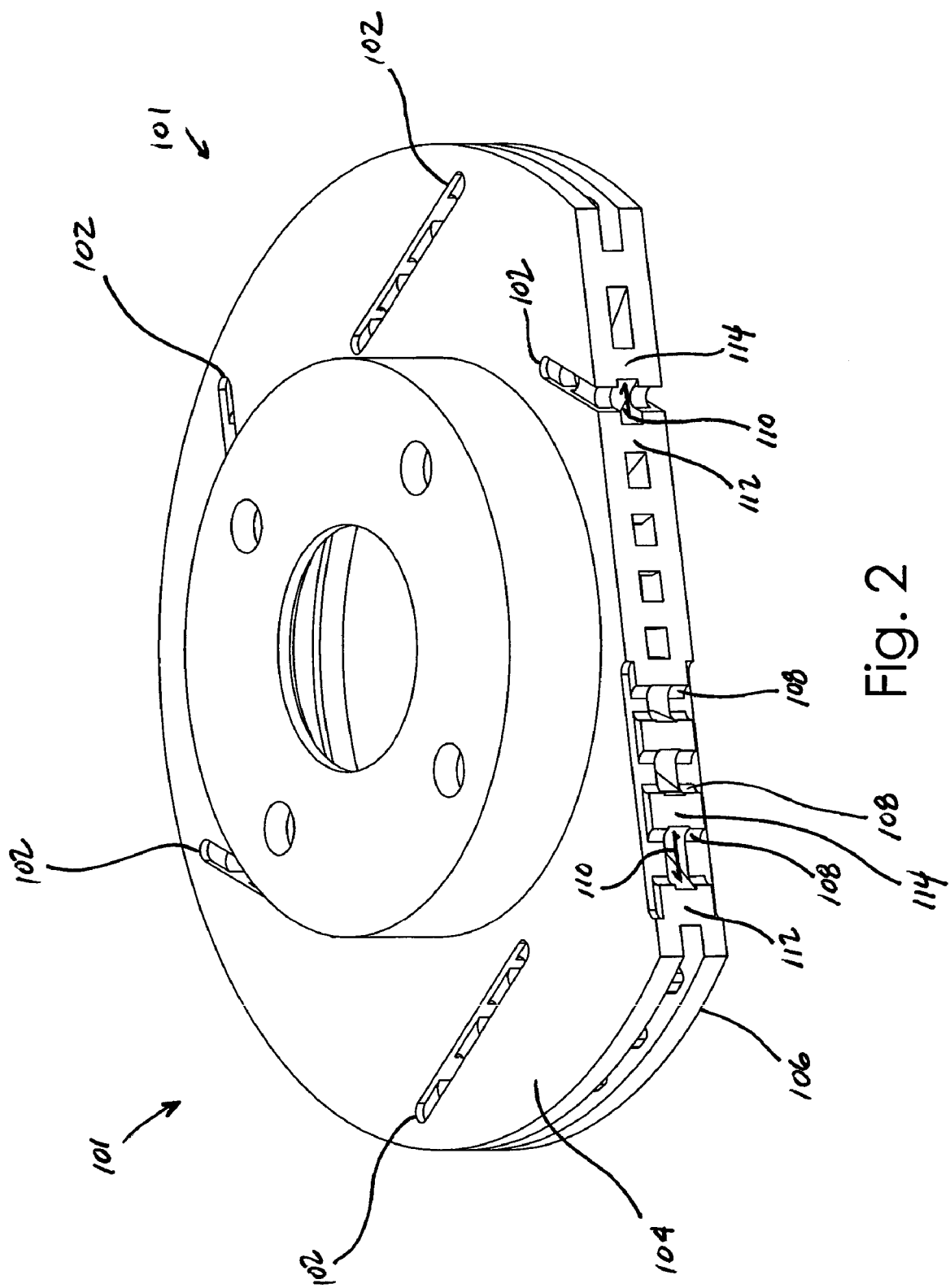
FIG. 2 is a cross-sectional, perspective view of section A—A (see FIG. 1B) of the brake rotor according to the embodiment shown in FIGS. 1A–1B.

As shown in FIGS. 1A–2, a disc brake rotor 101, for example, may include a plurality of slots 102 formed into either or both external braking surfaces 104 and 106 of the disc brake rotor 101. The depth of the slots are formed at a predetermined depth. Such depths may be, for example, between 0.01"–0.50" or greater, depending upon size of the brake rotor and braking application (passenger car, racing, bus, aircraft), or any other depth familiar to those of ordinary skill in the art for such slots. The slots may be positioned in any fashion: angled, as shown in FIG. 1, curved, zig-zag, straight, and any combination thereof.

The width of the slot may be between 0.01" and several inches or more, depending on the size of the brake rotor and braking application. For most automotive applications (e.g., passenger cars), for example, the width may be between 0.0625" and 0.25". The length of the slot may be any length, but preferably such that the position of the slot on the external braking surface generally covers a portion or all of the distance between the inner diameter of an external braking surface and the outer diameter of the external braking surface.

One of skill in the art will appreciate that the above noted dimensions are merely examples and may be used in any of the embodiments of the present invention as discussed below.

As illustrated, the slots 102 used on an external braking surface of a rotor may include one or more openings 108, formed in one or more of the external surfaces. The openings may for a conduit or "pathway" from the bottom of the slot (and thus the corresponding external surface) to one or more of the spaces 110 ("flow channels") between a pair 112 and 114 of adjacent vanes, for example, to allow gaseous communication between a slot 102 (and the corresponding external braking surface of the rotor) and the one or more flow channels between two or more vanes. The slots and openings on each external braking surface may be identically positioned on each side of the rotor so that the rotor is balanced, for example. Moreover, the openings are preferably cut through each external braking surface/disc to the ventilation space lying below, thus allowing gases to easily vent from each external braking surface to the ventilation space between two vanes provided below the opening, for example.

As shown in the figures, one or more openings may be positioned within one or more slots and may be circular, oblong, oval, rectangular, or any shape. An opening may conform to one or more of the dimensions of the slot upon which it resides. In that regard, an opening may be sized to correspond to a portion of the slot or the entire slot. Where the opening conforms to a portion of the slot, the portion may be related to either a portion of the width of the slot, a portion of the length of the slot or a portion of both. In addition, the openings may be formed in any shape including, but not limited to, oval, rectangular, circular, square, polygonal, and oblong variations thereof, for example.

Figure 3A:
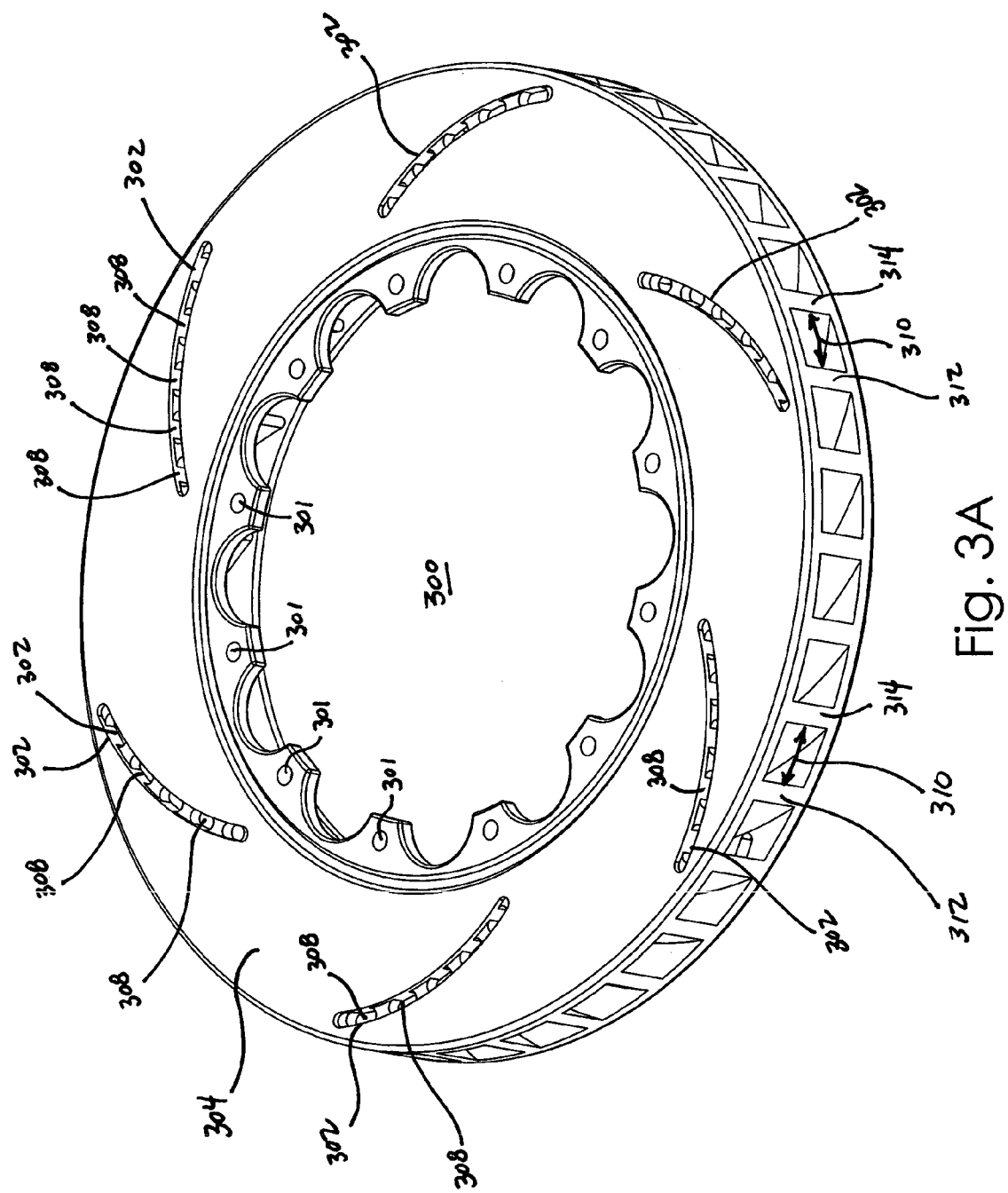
FIG. 3A is a perspective view of a brake rotor according to another embodiment of the present invention.
Figure 3B:
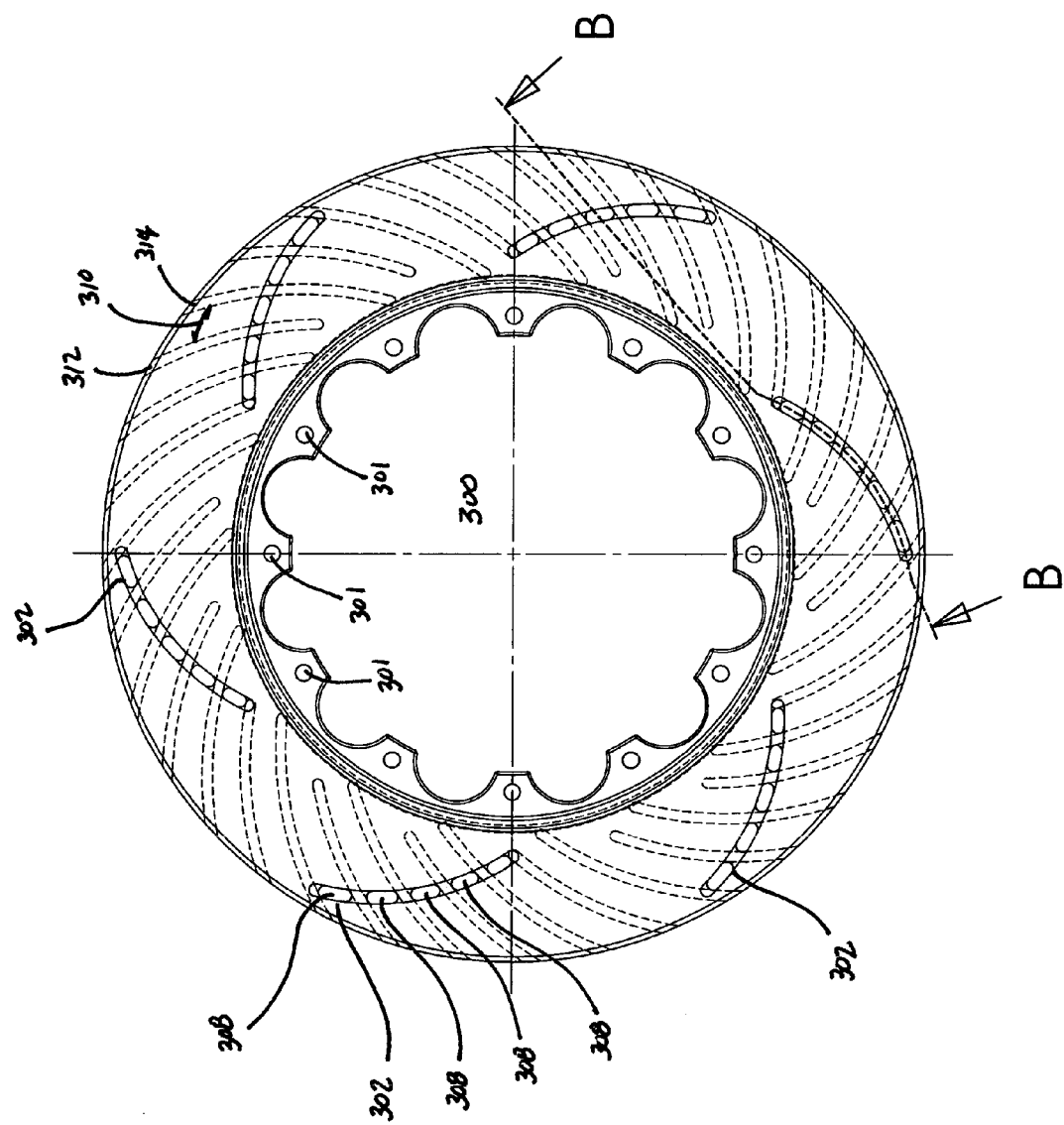
FIG. 3B is a top view of a brake rotor (including hidden lines), according to the embodiment of FIG. 3A.
Figure 4:
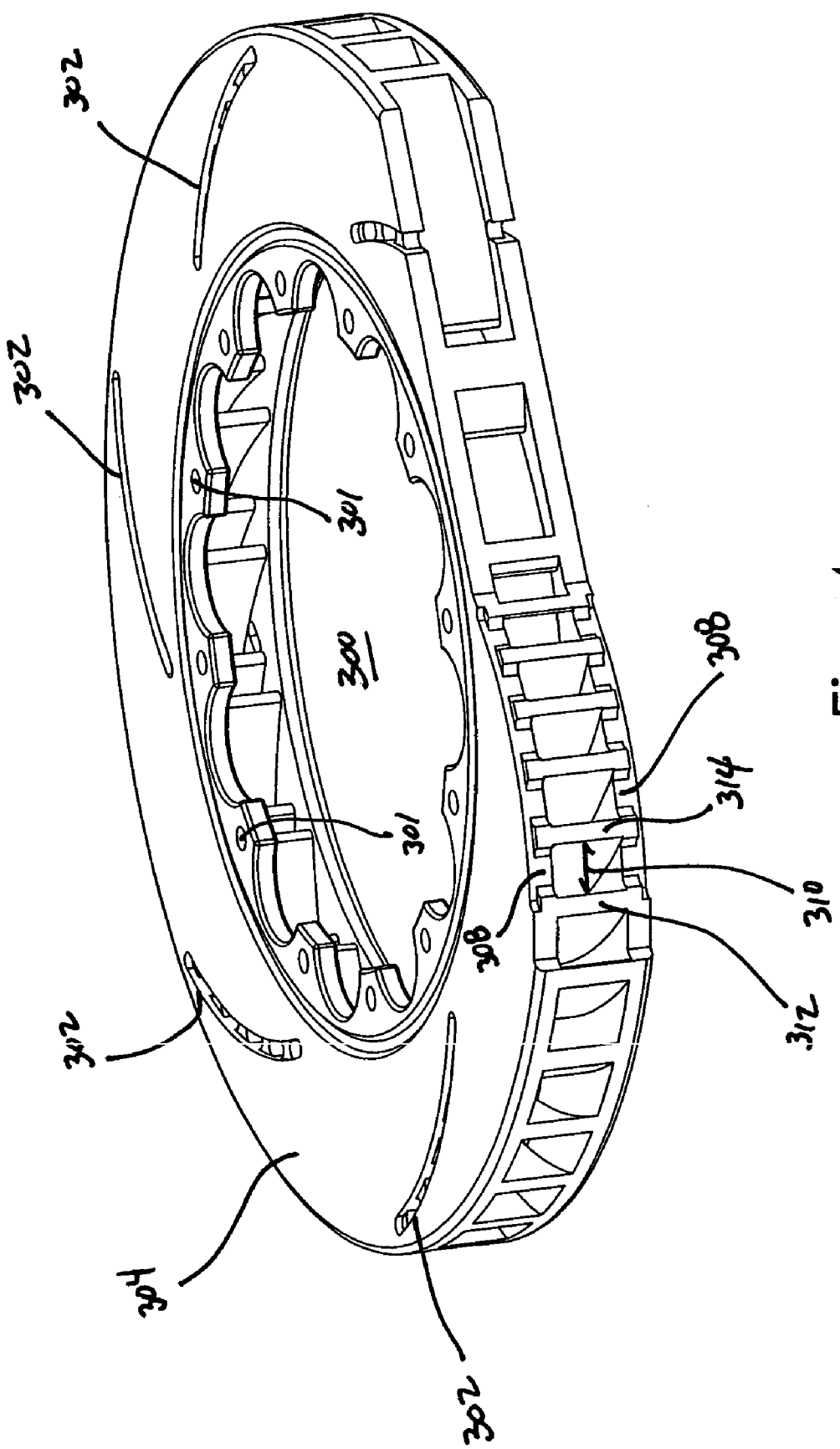
FIG. 4 is a cross-sectional, perspective view, according to section B—B (see FIG. 3B) of the brake rotor according to the embodiment shown in FIGS. 3A–3B.

FIGS. 3A–4 illustrate a "hat-less" version of a rotor utilizing the present invention having features similar to those illustrated in FIGS. 1A–2. As shown, the center portion 300 of the rotor 303 used to mount the rotor onto a hub of a motor vehicle is missing. In that regard, this type of rotor is mounted to the hub via a series of mounting holes 301. As with the rotor shown in the previous figures, the hatless rotor of FIGS. 3A–4 may include a plurality of slots 302 formed into either or both external braking surfaces 304 and 306. In contrast to the slots shown in FIG. 1A-2, the slots of FIGS. 3A–4 may be curved. Slots 302 may also include one or more openings 308, formed in one or more of the external surfaces (e.g., within a slot). The openings may connect the bottom of the slot to one or more of the spaces 310 (flow channels) between a pair 312 and 314 of adjacent vanes, for example, to allow gaseous communication between a slot 302 (and an external braking surface of the rotor) and the one or more spaces 310 between two or more vanes.

Figure 5A:
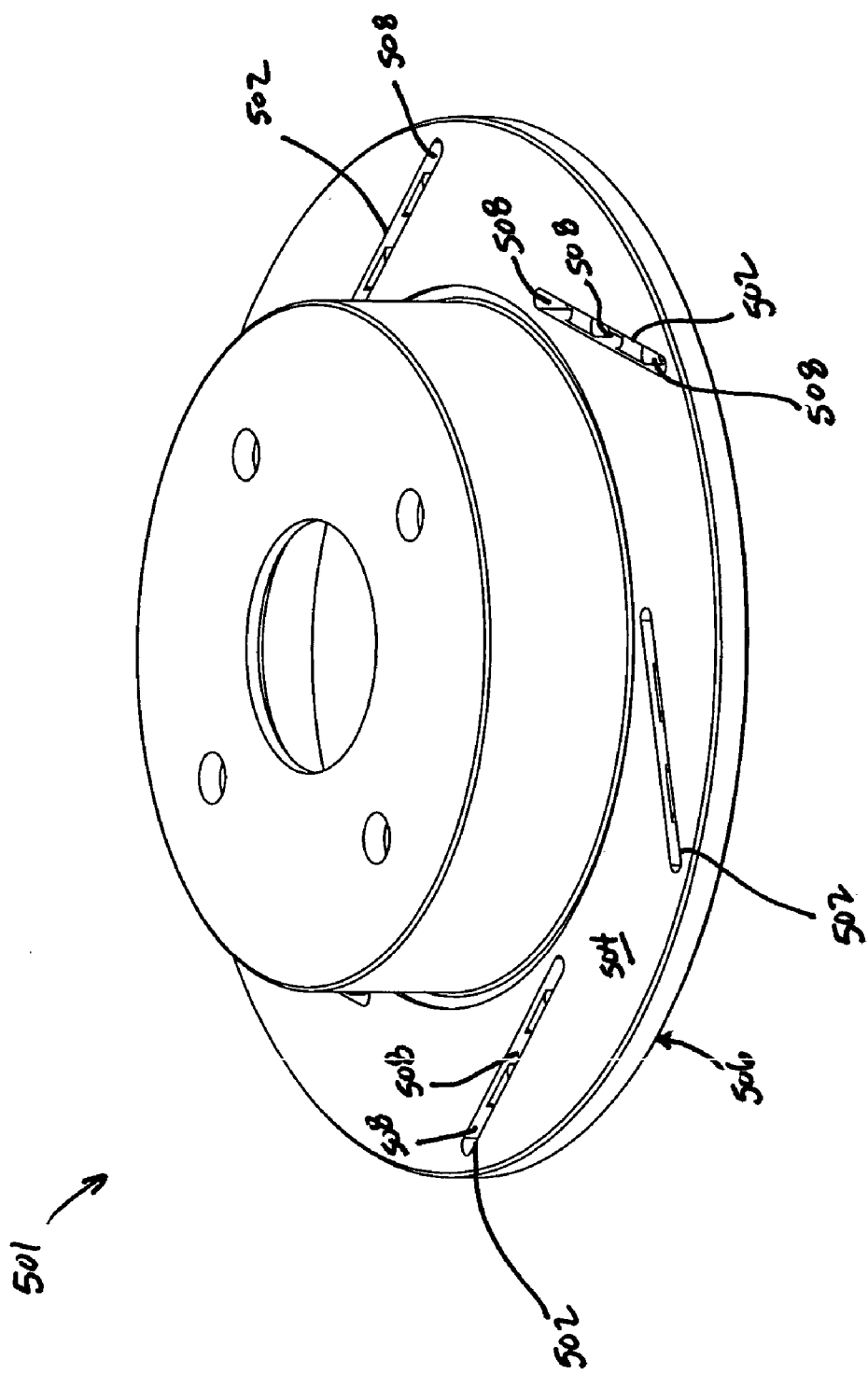
FIG. 5A is a perspective view of a brake rotor according to an embodiment of the present invention.
Figure 5B:
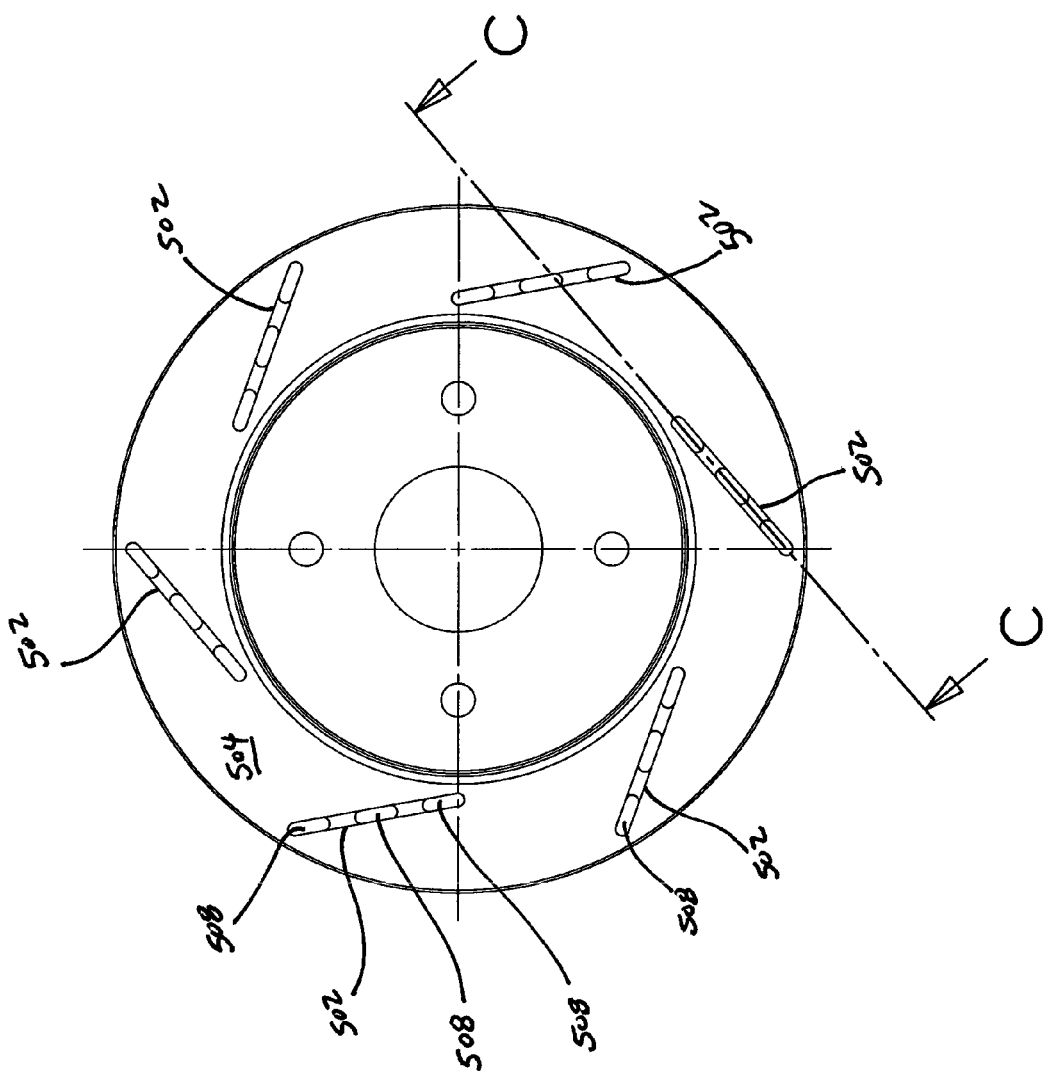
FIG. 5B is a top view of a brake rotor, according to the embodiment of FIG. 5A.
Figure 6:
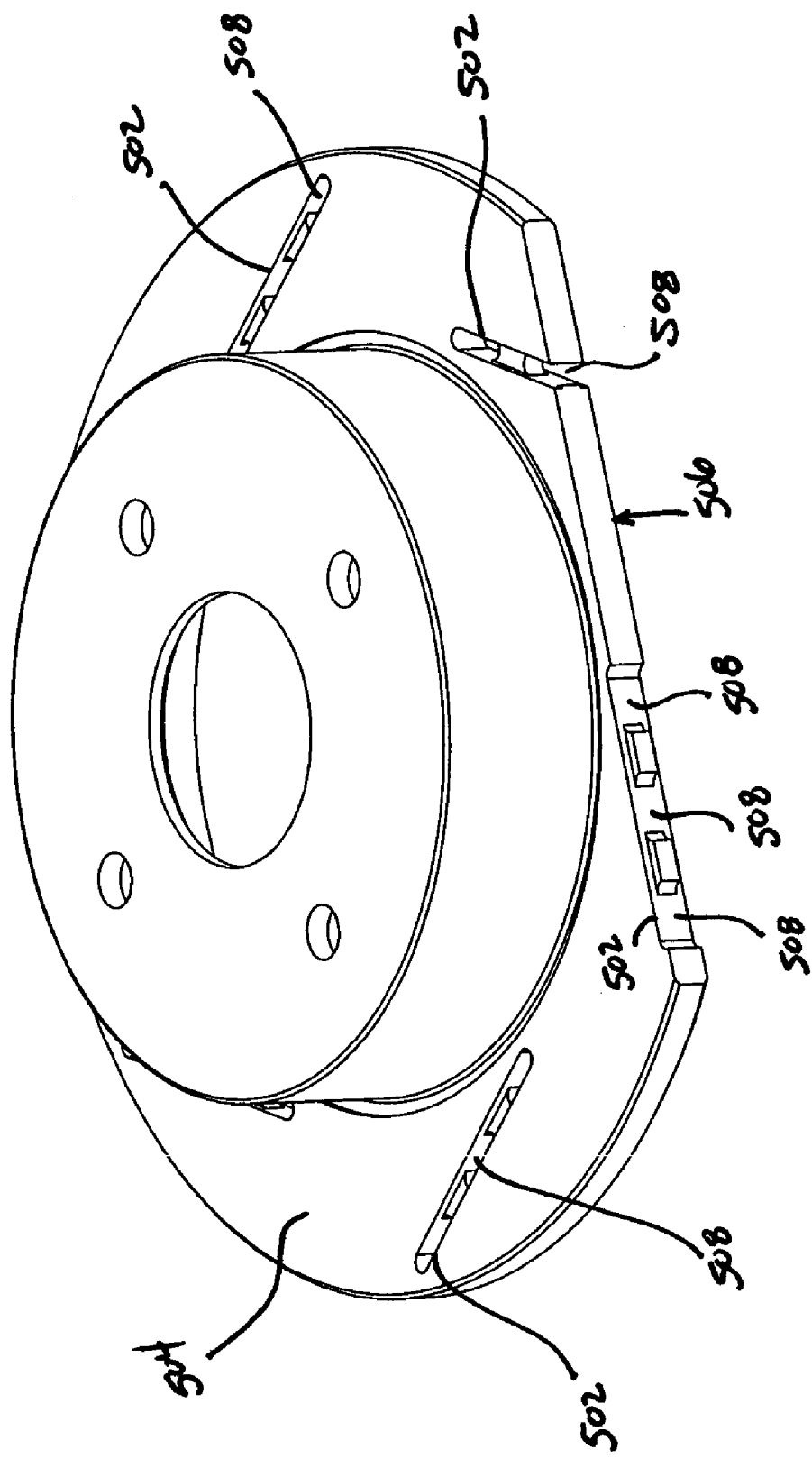
FIG. 6 is a cross-sectional, perspective view, according to section C—C (see FIG. 5B) of the brake rotor according to the embodiment of FIGS. 5A and 5B.

Upon the openings being formed in a solid brake rotor (FIGS. 5A–6; i.e., a brake rotor without internal vanes), the openings of each external surface are preferably aligned with one another. Thus, the volume of the space formed by the openings between the two external surfaces collects generated gases, for example, and exhausts them to ambient surroundings once either opening (or both) of a respective external surface is exposed to the environment (i.e., a brake pad does not block the gaseous communication between the space and the environment). Accordingly, as shown in FIGS. 5A–6, a solid rotor 501 includes two braking surfaces 504 and 506 and a plurality of slots 502 formed into either or both external braking surfaces. One or more openings 508 may be included in one or more slots on one or more of the two braking surfaces.

Having now described some of the embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention. The contents of any references cited throughout this application are hereby incorporated by reference. The appropriate components, processes, and methods of those documents may be selected for the present invention and embodiments thereof.

What is claimed is:

1. A self-cleaning, ventilated brake rotor comprising:

first and second circular members having annular braking surfaces jointly defining inner and outer circumferential surfaces and a central portion;

an elongated slot provided in each annular braking surface, each said slot having a depth, a width and a length extending from said central portion to an outer periphery of said rotor;

a plurality of spaced openings in a bottom of each said elongated slot;

each said elongated slot terminating adjacent to but short of and spaced from said outer periphery and central portion of said rotor;

a flow channel is provided between the circular members and opposite said inner and outer circumferential surfaces; and a plurality of vanes in said flow channel between the inner and outer circumferential surfaces, wherein at least a pair of vanes defines a flow channel having a first flow channel opening near the central region and a second flow channel opening provided near a periphery of the brake rotor, and the opening in each said elongated slot communicates with said flow channel.

2. The rotor according to claim 1, further comprising a hat portion disposed in the central portion and adapted for mounting the rotor to a vehicle.

3. The brake rotor according to claim 1, wherein each of said spaced openings has a width or radius equal to or smaller than the width of the slot.

4. The brake rotor according to claim 3, wherein all or a portion of each said elongated slot is substantially straight.

5. The brake rotor according to claim 3, wherein each said elongated slot includes a curve.

6. A vehicle having a disc braking system including one or more disc brake rotors, each rotor comprising;

first and second circular members having annular braking surfaces on opposite sides of said rotor, said rotor having a central portion;

a plurality of angled and spaced elongated slots provided on each of said annular braking surfaces, each of said elongated slots having a depth, a length, first and second ends, and a width with a first end of each elongated slot adjacent to and spaced from said central portion and the second end of each elongated slot adjacent to and spaced from an outer periphery of said rotor; a plurality of vanes between said circular members adjacent said annular braking surfaces; and each elongated slot in said first and second annular braking surfaces having a plurality of spaced bottom openings for communicating with an elongated slot on an opposite braking surface through a space between adjacent vanes.

* * * * *